May 19, 1925. Re. 16,074

A. WAHLE

ROTARY PUMP

Original Filed Nov. 6, 1915 2 Sheets-Sheet 1

Inventor
Adolph Wahle

By Lloyd L. Evans Attorney

May 19, 1925.

Re. 16,074

A. WAHLE

ROTARY PUMP

Original Filed Nov. 6, 1915 2 Sheets-Sheet 2

Inventor.
Adolph Wahle

By Lloyd L. Evans
Attorney

Reissued May 19, 1925.

Re. 16,074

UNITED STATES PATENT OFFICE.

ADOLPH WAHLE, OF DAVENPORT, IOWA.

ROTARY PUMP.

Original No. 1,228,267, dated May 29, 1917, Serial No. 59,905, filed November 6, 1915. Application for reissue filed January 23, 1922. Serial No. 531,268.

*To all whom it may concern:*

Be it known that I, ADOLPH WAHLE, a citizen of the United States, residing at Davenport, in the county of Scott and State of Iowa, have invented new and useful Improvements in Rotary Pumps, of which the following is a full, clear, and exact description.

My invention relates to rotary pumps, and particularly to the class of pumps employing what is known as an overshot rotor.

The objects of my invention are to create a maximum centrifugal effect of the water passing through the casing of the pump while at the same time creating a vacuum by rapidly expelling the same, and to subject the water to the action of the rotor causing said centrifugal and vacuum effects for as great a distance as possible around the periphery of said rotor. This I accomplish by the means hereinafter fully set forth, and as particularly pointed out in the claims.

Figure 1:
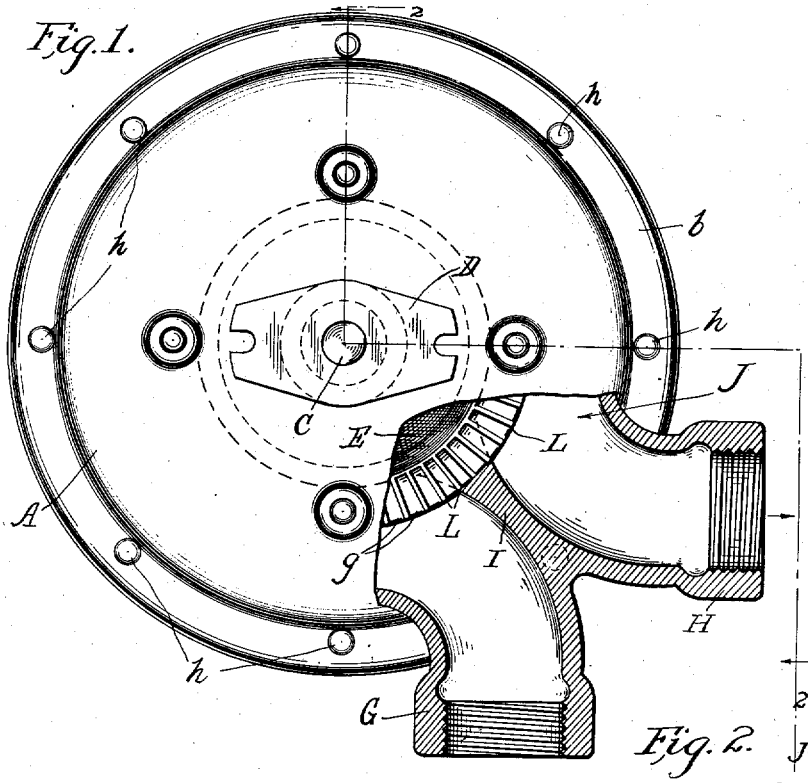
Figure 1 is a side view of my improved pump showing a portion of the casing broken away.
Figure 2:
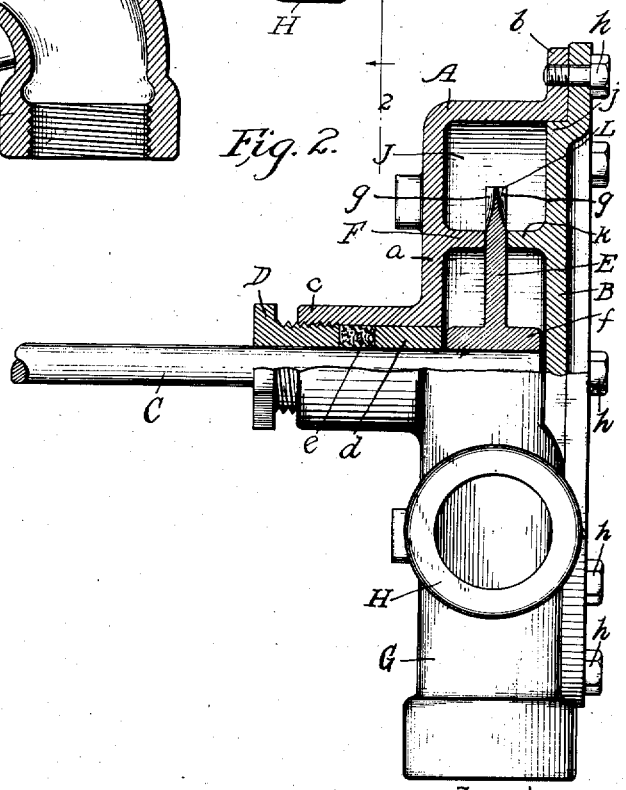
Fig. 2 is a transverse section taken on dotted line 2—2, Fig. 1.
Figure 3:
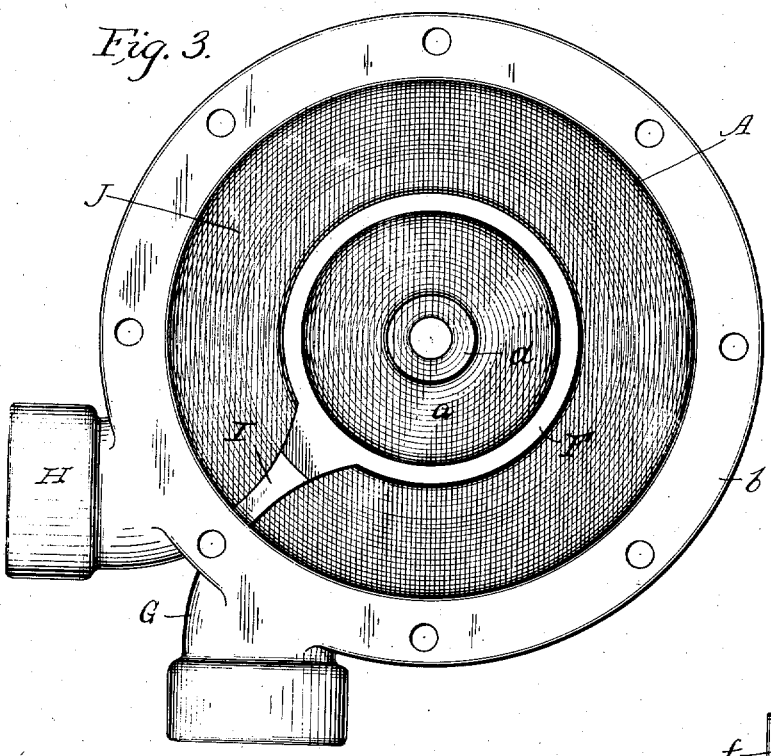
Fig. 3 is a view of the inner side or interior of one section of the casing of the pump.
Figure 5:
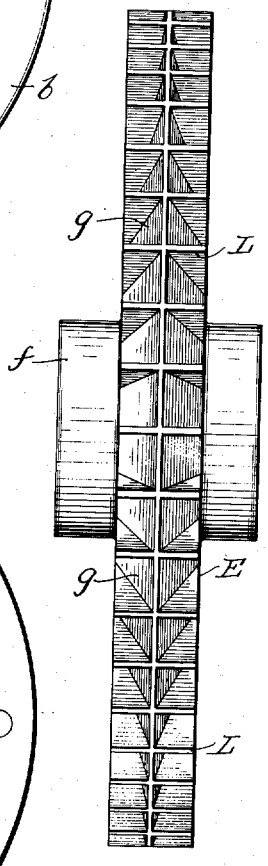
Fig. 5 is an edge view of the rotor removed from its casing.
Figure 4:
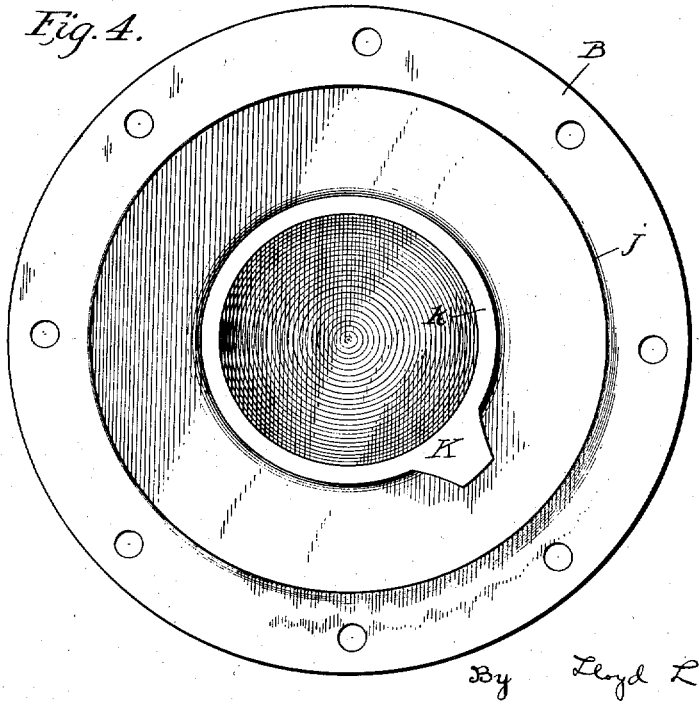
Fig. 4 is a similar view of the interior of the other section of the same.

My invention comprises a casing and a rotor as the principal features. The casing consists of two sections, A and B, the former of which is saucer-shaped and has a cylindrical rim portion that is substantially at right angles to the transverse web *a* thereof, and has its annular edge provided with an outwardly projecting transverse flange *b*. The center of web *a* of this section is provided with an axially projecting tubular boss *c*, the inner end of which has a bushing *d* inserted therein in which the drive-shaft C of the pump is journaled. Between the outer end of boss *c* and bushing *d* suitable packing *e* is inserted around shaft C, which is compressed and held in place by a gland-nut D.

On the inner end or extension of shaft C (which terminates before it reaches the transverse plane of flange *b*) my improved rotor E is securely mounted. The construction of this rotor will be hereinafter more fully explained; for the present, suffice it to say that the hub *f* of this rotor practically corresponds in length to and surrounds the entire inner extension of the drive-shaft, that the disk or circumferential web projecting from said hub that constitutes the body of the rotor is of a thickness corresponding to approximately three-tenths of the length of hub *f* and projects from its center of length and that the radius of its outer circumference is slightly less than three-fourths of the radius of the inner circumference of the rim of section A.

The peripheral portion of the rotor is provided with a series of buckets the bottoms *g* of which start from a point on the periphery of the rotor midway between its sides and incline outward toward the shaft and terminate at a point about three-fourths of the radius of the periphery of the rotor. The transverse web of section A is provided with an inwardly projecting annular flange F that extends as far as the adjacent side of the web of the rotor, but does not bear against the same sufficiently to create friction. At a suitable point the rim of section A is provided with an inlet stub G and immediately next the same with an outlet stub H, and these two stubs are separated by a partition I which is made integral with and projects from the transverse web of said section A radially from flange F to the rim of said section. The portion of this partition alongside of the rotor projects laterally from the transverse web of section A only to the same extent as flange F until it reaches the periphery of the rotor, but from this point to the inner circumference of the rim of said section A it projects laterally to and terminates within a short distance of the transverse plane of the outer surfaces of the circumferential flange *b* of the same.

The open side of section A is closed by section B of the casing, which latter practically constitutes a circular head, the circumference of which corresponds to the circumference of flange *b* of section A to which it is secured by a series of screws *h*. Just within the inner circumference of the rim of section A, section B is depressed to form a rabbeted seat *j* for the annular flanged edge of section A, and to bring the inner side surfaces of said section B the same distance from the side of the rotor as the inner transverse surface of section A. This section B is provided with an inwardly projecting annular flange *k* of the same diameter as annular flange F, which extends and terminates next the side of the rotor opposite to flange F, and this flange *k* has a radially projecting portion K which corresponds in shape to the corresponding inner portion of partition I and terminates at the same radius as the periphery of the rotor. This projecting portion is also made integral with the inner surface of section B, and the outer wider portion of partition I projects past the periphery of the rotor and the end of projecting portion K to the inner transverse side of section B.

As thus constructed, when the two sections of the casing are connected together by screws *h* or otherwise, a channel J is formed, the entrance to which is through stub G, and the exit through stub H. The bucket portion only of the rotor projects and revolves in this channel, except where the rotor passes through partition I, the side edges of which latter are curved so as to permit the water to enter said channel and discharge therefrom with as little friction as possible.

As hereinbefore stated, the peripheral portion of the rotor is provided with a series of buckets and the bottoms of these buckets are inclined and they are separated, one from the other, by a series of equidistant partitions or blades L that extend radially and have their sides transverse to the sides of the web of the rotor.

It will be apparent from the foregoing description and from the drawings of my invention that, as only the bucket portion of the rotor travels in channel J and as the outer circumference of said rotor is less than half the distance between the inner and outer circumferences of the channel, the rotor will, when revolved at a high rate of speed, throw the water outward toward the sides of channel J, and toward the outer circumference of the same, and at the same time the partitions or blades L of the rotor will propel the water forward at a very high rate of speed and they will retain their purchase upon the body of water traversing channel J from the entrance thereof to the exit of the same for a distance corresponding nearly to the entire circumference of the casing, and their ability to do this constitutes a very efficient rotary pump that creates a great vacuum and enables it to lift the water at considerable distance and expel it with great force.

I have above mentioned a relative thickness dimension and a relative length of the radius of the web of the rotor, and have referred to the fact that, as herein shown, the outer circumference of the rotor is of a radius more nearly equal to the radius of the inner circle than to that of the outer circle of the water duct or passage. But it will be seen that the dimensions of these and of the other parts are to be suitably correlated to accomplish the best results.

And I do not wish to be confined to the exact proportions of the various elements of my invention as hereinbefore specified, although they are practically correct as stated, for these can be changed without departing from the spirit of my invention.

What I claim as new is:—

1. In a rotary pump, a rotor the marginal portion of the outer circumference of which is provided with a series of buckets the bottoms of which are substantially flat and incline from the periphery thereof to the side of the same nearer the center of the rotor and are separated by blades having flat transverse sides.

2. In a rotary pump, a rotor the marginal portion of the outer circumference of which is provided on each side of the same with a series of buckets the bottoms of which are inclined substantially from the center of width of the periphery thereof to the sides thereof at points nearer the center of the rotor and are separated by equidistant blades having substantially flat transverse sides.

3. In a rotary pump, a casing having a passage extending circumferentially from a suitable inlet to a suitable outlet located adjacent thereof and having a circumferential slot in the annular transverse partition constituting the inner circumference of the same, of a rotor the axis of which is concentric to the center from which said axis is struck and which has an outer marginal portion which extends through said slot into said passage and is provided with a series of buckets therein each having a substantially flat bottom inclining from the periphery to the side thereof at a point adjacent said annular partition and separated by transverse blades.

4. In a rotary pump, a casing having a passage extending circumferentially from a suitable inlet to a suitable outlet located adjacent thereof and having a circumferential slot in the annular transverse partition constituting the inner circumference of the same, of a rotor the axis of which is concentric to the center from which said axis is struck and which has an outer marginal portion which extends through said slot into said passage and is provided with a series of buckets therein each bucket on each side of the rotor having a substantially flat bottom inclining from the center of width of the periphery of said rotor to a point on the side thereof adjacent said transverse partition and separated by equi-distant transverse blades.

5. In a rotary pump, a casing having a passage extending circumferentially from a suitable inlet to a suitable outlet located adjacent thereof and having a circumferential slot in the annular transverse partition constituting the inner circumference of the same, of a rotor the axis of which is concentric to the center from which said axis is struck and which has an outer marginal portion which extends through said slot into but less than half the depth of said passage and is provided with a series of buckets therein, each bucket on each side of the rotor having a substantially flat bottom inclining from the center of width of the periphery of said rotor to a point on the side thereof adjacent said transverse partition and separated by equi-distant transverse blades.

6. In a rotary pump, a casing consisting of two circular sections, one of which has a cylindrical rim projecting from its transverse web, and an annular flange projecting from said web in the same direction as said rim and between the same and its axis and has a suitable inlet opening in said rim and a discharge opening therein adjacent thereto but separated therefrom by a transverse partition, and the other section of which closes the open side of said first mentioned section and has an annular flange projecting sidewise toward and is the same diameter as the annular flange of the other section, in combination with a shaft journaled in suitable bearings in the center of said first-mentioned section, and a rotor securely mounted thereon within said section and having its marginal portion extending between said annular flanges into the circumferential passage between said annular flanges and said rim and provided with a series of buckets therein each having a substantially flat bottom inclining from the periphery to the side thereof at a point adjacent said annular partition and separated by transverse blades.

7. In a rotary pump, a casing consisting of two circular sections, one of which has a cylindrical rim projecting from its transverse web, and an annular flange projecting from said web in the same direction as said rim and between the same and its axis and has a suitable inlet opening in said rim and a discharge opening therein adjacent thereto but separated therefrom by a transverse partition, and the other section of which closes the open side of said first-mentioned section and has an annular flange projecting sidewise toward and is the same diameter as the annular flange of the other section, in combination with a shaft journaled in suitable bearings in the center of said first-mentioned section, and a rotor securely mounted thereon within said section and having its marginal portion extending between said annular flanges into the circumferential passage between said annular flanges and said rim and provided with a series of buckets therein each bucket on each side of the rotor having a substantially flat bottom inclining from the center of width of the periphery of said rotor to a point on the side thereof adjacent said transverse partition and separated by equi-distant transverse blades.

8. In a rotary pump, a casing consisting of two circular sections, one of which has a cylindrical rim projecting from its transverse web, and an annular flange projecting from said web in the same direction as said rim and between the same and its axis and has a suitable inlet opening in said rim and a discharge opening therein adjacent thereto but separated therefrom by a transverse partition, and the other section of which closes the open side of said first-mentioned section and has an annular flange projecting sidewise toward and is the same diameter as the annular flange of the other section, in combination with a shaft journaled in suitable bearings in the center of said first-mentioned section, and a rotor securely mounted thereon within said section and having its marginal portion extending between said annular flanges into the circumferential passage between said annular flanges and said rim but less than the depth thereof and provided with a series of buckets therein each bucket on each side of the rotor having a substantially flat bottom inclining from the center of width of the periphery of said rotor to a point on the side thereof adjacent said transverse partition and separated by equi-distant transverse blades.

9. In a rotary pump, the combination of a casing, a liquid inlet stub therefor, a liquid outlet stub therefor, an annular partition in said casing forming an annular passage for the flow of liquid from said inlet stub to said outlet stub, an annular slot formed in said partition, a rotor having a web portion and a marginal portion, a series of buckets in the marginal portion of said rotor, the rotor extending through the slot and constituting a closure therewith for the inner circumference of said passage, the walls of said slot extending as far as the adjacent side of the rotor without bearing against the same sufficiently to create friction, a transverse partition extending across said passageway between the inlet stub and the outlet stub and having an opening therethrough of sufficient size to permit the operation of the rotor without frictional engagement therewith, said partition being adapted to overlie at all times more than one bucket in order to direct the liquid through the outlet and to prevent substantial direct return flow of liquid from the outlet to the inlet of said passage.

10. In a rotary pump, the combination of a casing, a liquid inlet stub, a liquid outlet stub, an annular passage adapted to permit the flow of liquid from said inlet to said outlet, the radial width of said passage being less than one-half of the radius of the outer circumference of said passage, a rotor having a marginal portion, a multiplicity of buckets in the marginal portion of the rotor, portions of said casing extending as far as the adjacent side of the rotor without bearing against the same sufficiently to create friction, said casing and said rotor cooperating to form said annular passage, said buckets being adapted to propel the liquid forward in the passage from the inlet to the outlet upon rotation of the rotor, a transverse partition extending across said passage and terminating adjacent the bucket portion of the rotor without bearing against the rotor sufficiently to create friction to permit the operation of the rotor without frictional engagement therewith, said partition being adapted to overlie at all times more than one bucket in order to direct the liquid through the outlet and to prevent substantial direct return flow of liquid from the outlet to the inlet of said passage.

11. In a rotary pump, the combination of a casing having a passage extending circumferentially from a suitable inlet to a suitable outlet located adjacent thereof, a rotor mounted for rotation in said casing, portions of said casing extending as far as the adjacent side of the rotor without bearing against the same sufficiently to create friction, a series of buckets in the marginal portion of said rotor, said buckets being adapted to propel the liquid forward in the passage from the inlet to the outlet upon rotation of the rotor, a transverse partition extending across said passage from the outer circumference of the passage to a position closely adjacent the marginal edge of the rotor without bearing against the same sufficiently to create friction, said partition overlying at all times more than one bucket in order to direct the liquid through the outlet and to prevent substantial direct return flow of liquid from the outlet to the inlet of the passage.

12. In a rotary pump, the combination of a casing, a liquid inlet stub, a liquid outlet stub, an annular passage formed in said casing adapted to permit the flow of liquid from said inlet stub to said outlet stub, a rotor having a marginal portion, a multiplicity of buckets in the marginal portion of the rotor, portions of said casing extending as far as the adjacent side of the rotor without bearing against the same sufficiently to create friction, said casing and said rotor cooperating to form said annular passage, said buckets being adapted to propel the liquid forward in the passage from the inlet to the outlet upon rotation of the rotor, a transverse partition extending across said passage between said inlet stub and said outlet stub and having an opening therethrough of sufficient size to permit the operation of the rotor without frictional engagement therewith, said partition being adapted to overlie at all times more than one bucket in order to direct the liquid through the outlet and to prevent substantial direct return flow of liquid from the outlet to the inlet of said passage.

ADOLPH WAHLE.